United States Patent [19]

Birch

[11] 4,269,033

[45] May 26, 1981

[54] SWITCHING DEVICE

[76] Inventor: Robert J. Birch, 5273 Folkstone, Troy, Mich. 48098

[21] Appl. No.: 116,939

[22] Filed: Jan. 30, 1980

[51] Int. Cl.³ .......................... B60H 3/04; F25B 27/00
[52] U.S. Cl. ....................................... 62/133; 62/323.4
[58] Field of Search ............... 62/133, 323 C; 236/51; 200/83 T, 83 J

[56] References Cited

U.S. PATENT DOCUMENTS

| | | | |
|---|---|---|---|
| 2,506,208 | 5/1950 | Gibson | 200/83 J |
| 2,648,016 | 8/1953 | Gastle | 200/83 T |
| 2,833,478 | 5/1958 | Middleton | 236/51 X |
| 3,259,713 | 7/1966 | Herridge, Jr. et al. | 200/83 T |
| 3,462,964 | 8/1969 | Haroldson | 62/133 |
| 4,135,368 | 1/1979 | Mohr et al. | 62/133 |

Primary Examiner—William E. Wayner
Assistant Examiner—Harry Tanner
Attorney, Agent, or Firm—Dale A. Winnie

[57] ABSTRACT

A means and method for reducing and/or eliminating the drag and power loss imposed on a vehicle engine by air conditioning that is driven thereby, during selected load and power demand situations, both to conserve and have added power available and to provide improved fuel economy, and which includes; a vacuum responsive switching device provided in the electrical line operative of the air compressor clutch, means for readily adjusting the responsiveness of said switch to different and varying load conditions, and use of a fast idle connection that is inoperative when the air conditioner compressor is cut-out and also inoperative.

3 Claims, 1 Drawing Figure

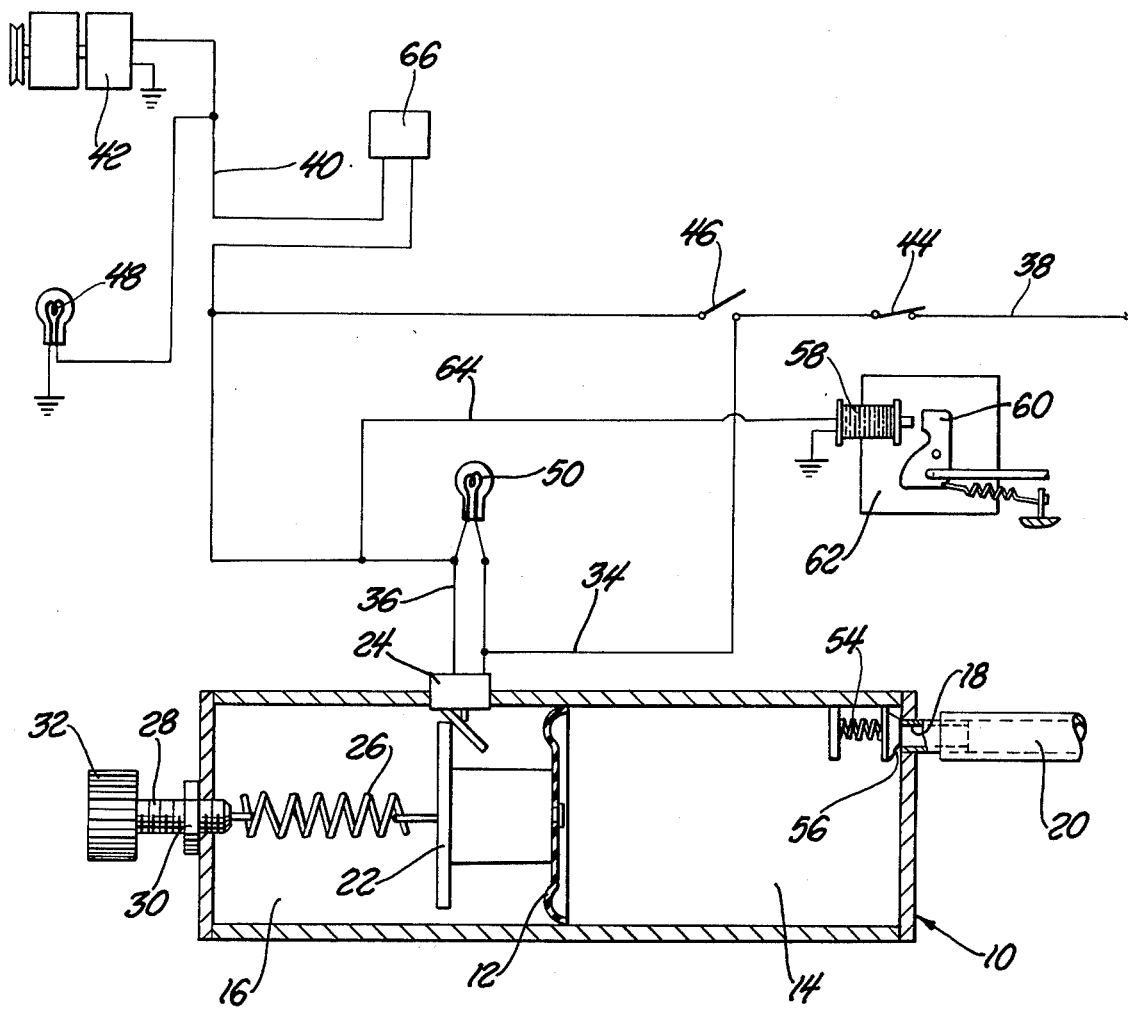

SWITCHING DEVICE

FIELD OF INVENTION

This invention relates to a means and method for obtaining added road horsepower on demand, and increased fuel economy on vehicles that are equipped with air conditioning.

BACKGROUND

Although air conditioning has long been known and used with automotive vehicles, it was first provided in expensive high powered luxury cars where the added drag and power loss caused by engine driven accessory, and the poorer fuel economy that resulted therefrom, were of no real concern.

Over the years, as the popularity and availability of air conditioning increased, so too did the size and horsepower of most engines used in lower priced cars, and since fuel costs remained low, there was still no concern for the loss of power and fuel economy that came from having air conditioning in vehicles.

In Europe and elsewhere, where smaller cars and higher performance have long been important, and air conditioning in smaller luxury cars has become increasingly popular, particularly for exporting to this country, some efforts have been made to cut-out or switch-off the air conditioning during peak power demands of the engine. But little thought or concern has been given to the economy and fuel savings that might also be obtained in doing so.

Generally, some sort of switching device has been proposed whereby the magnetic clutch for the air conditioner, which is normally temperature or pressure controlled, is deactivated when the vehicle accelerator pedal is pressed to the floor, as in a vehicle passing situation. And either a simple on-off switch or a manifold pressure responsive switching device has been suggested for such purposes.

Although the accelerator pedal actuated on-off switch has its advantages in plain simplicity, it will be appreciated that this type of arrangement allows for no variations and is really available only to obtain a full power condition. Full power not fuel economy is the only concern.

In using some type of pressure responsive switching means, the air conditioner can be made to cut-out at other than full power and maximum load conditions. However, this is normally a pre-set factory determination and consequently hill and mountain climbing conditions, with different loads, in different cars, will effect when the air conditioner will or will not cut-out and no ready adjustment is available for extremely hot weather conditions when more frequent use of the air conditioner may be desirable, despite power and economy losses.

Another consideration frequently made in using air conditioners with smaller engines, is the need for a faster idle, when the air conditioner is operative, so that the car will not stall out as a result of added engine load while the air compressor is operating.

Usually the fast idle is obtained by a solenoid that is active when the air conditioner is turned on and which is effective in holding the idling cam to a fast idle setting. But, in using this, it is obvious that the fast idle is obtained whether the compressor clutch is engaged or disengaged by its internal switching devices. Obviously, to improve fuel economy, the fast idle should only be used when the compressor clutch is engaged.

SUMMARY OF THE INVENTION

This invention relates to, and has as its main objective, providing for the more practical and economical use of air conditioning.

It is proposed to make use of a vacuum pressure responsive switching device, located in the passenger compartment, which will sense the power needs and load conditions of the engine, to cut-out and de-energize the electrical circuit to the air conditioner compressor.

Further, it is proposed to have the switching device adjustable so that it can be set and modified to sense and react to different power needs and load conditions.

Still further, it is proposed to have the switching device provide a faster response and slower reset condition to avoid on-off fluctuations in close setting circumstances.

And, still further, it is proposed to eliminate the need for a constant fast idle setting, whenever the air conditioning is turned on, by having it available only when the air compressor for the system is operative.

These and other objects and advantages will be more obvious in the description of a preferred embodiment of the invention which follows hereinafter.

DESCRIPTION OF ILLUSTRATED EMBODIMENT

The drawing FIGURE shows a vacuum responsive switching device 10 which includes a chamber area that has a diaphragm member 12 provided across it and which divides the chamber area into two separate and smaller chamber area spaces 14 and 16, one on each side of the diaphragm member.

An opening and fitting 18 is provided through one end of the switching device for communication with the chamber area space 14 and connection to a small hose 20 connecting into the intake manifold or elsewhere for sensing intake manifold pressure and providing a negative or vacuum pressure on one side of the diaphragm member 12.

A switch tripping mechanism 22 is provided on the other side of the diaphragm member, in the other chamber area space 16, and a normally open electrical switch 24 is mounted in the housing wall of the switching device immediately next adjacent thereto and for actuation thereby. The actuation being accomplished by movement to the right (referring to the drawing FIGURE) to close the switch and to the left to cause it to be opened.

Connected to the switch tripping mechanism and through it to the diaphragm member 12, is a tensioning spring 26 which has the other end connected to an adjustment screw 28 threaded through an opening and fitting 30 respective thereof and through the other end of the switching device.

A suitable knob 32 on the adjustment screw enables it to be turned in or out of the chamber area space 16 and to accordingly adjust the tension in the spring 24 and its effect upon the diaphragm member.

Electrical leads 34 and 36 are connected to the electrical switch 24 and are adapted for connection into a main power source line 38 and an electrical connection 40 that is made with the air conditioning compressor 42 and the magnetically responsive clutch means that is operative thereof.

The power source line 38 has a temperature responsive switch 44 which is closed to call for air conditioning service and it also has a switch 46 by means of which operating power is provided directly to the service line 40 to the air conditioning compressor and the innovations provided by the present invention may be by-passed.

A pilot light 48 is provided to signal and indicate that the air conditioning compressor clutch 42 is engaged and operative and another pilot light 50 is connected across the switch leads 34 and 36 to indicate that the compressor clutch is disengaged by switch 10. (When bulb 50 illuminates, the voltage drop will cause the compressor clutch 42 to disengage).

If the main line switch 46 is closed, the switching device is by-passed and light 50 will not illuminate. But if the switch is open then it depends on whether the normally open switch 24, that is actuated by movement of the diaphragm member, is closed—in which case the pilot light 50 is still out, the bulb resistance being purposely insufficient to allow illumination even though in parallel connection with the switch—or the switch 24 is open, in which case the pilot light 50 is lit, and the compressor clutch 42 is disengaged.

Accordingly, the air conditioner compressor is operative whenever the pilot light 48 is lit and pilot light 50 is not lit. And the air conditioner compressor is cut-out by switch 10 and inoperative when both pilot lights 50 and 48 are lit.

Referring back to the manifold vacuum connection 18, at one end of the switching device, there is seen a check valve 52 that is held into a closed position by the spring 54. And, there is a minute bleed-by opening 56 provided in the face of the check valve to allow a slow evacuation of chamber 14.

Upon a decrease in the manifold vacuum, as sensed within the connection 20, the check valve 52 will open allowing an immediate decrease of vacuum in chamber 14. This allows the counteracting spring 26 to take over and to pull the diaphragm 12 and switch tripping mechanism 22 back, which in turn causes switch 24 to open and electrical power to the air compressor 42 to be cut off.

As the vacuum condition sensed in the hose connection 20 begins to increase, the check valve 52 will close, and chamber 14 will begin to slowly evacuate through bleed-by 56. This slow evacuation will eliminate fast "on-off" fluctuations during close setting curcumstances.

Once the vacuum condition in the chamber area space 14 is sufficient to overcome the spring tension of spring 26, the diaphragm 12 will be drawn to the right (with reference to the drawing FIGURE) and against the resistance of the spring 26 but sufficiently to again set and close the circuit switch 24 and re-energize air compressor clutch 42.

For engine idling situations, it has been common to use a fast idle setting that is automatically called into service when the air conditioning is switched on. However, as is obvious, the fast idle is only required when the compressor clutch is engaged causing an additional load on the engine.

Accordingly, in the present instance the electrical solenoid 58 that is used to set the cam 60, which is part of the throttle linkage on the carburetar 62, is connected by an electrical lead 64 to the electrical lead 40 to the air conditioner compressor 42. And, as a consequence, there is no electrical power to the fast idle setting solenoid 58 unless there is also electrical power to the compressor clutch for the air conditioning system.

A further improvement is obtained in the use of a time delay relay 66 in the circuit.

Whenever solenoid 58 is activated during idle, a short period of time passes before the engine rpm increases to a fast idle condition. And if the compressor clutch 42 was to engage at the same time that solenoid 58 was energized, the engine might stall before its rpm rate had increased sufficiently to counteract the increased engine load caused by the compressor. Accordingly, a time delay relay 66 is recommended between the solenoid 58 and the compressor clutch 42 and, preferably, one that allows a 1.5 second delay, or is adjustable, and will allow the engine to reach its fast idle rpm rate before the clutch 42 engages.

A brief discussion of the operation of the disclosed system will help provide a better understanding of the functions of the different components.

The switching device 10 is preferably mounted in the passenger compartment of a vehicle near the driver and where he can make suitable adjustments to it as circumstances dictate.

At an engine idling condition, for example, with the air conditioner turned on, the thermostat 44 closing the circuit, and the by-pass switch 46 open to activate the switching device, the adjustment screw 28 can be turned in enough to allow the manifold vacuum pressure in the chamber area space 14 to overbalance the pull of the tensioning spring 26 and cause the switch 24 to be closed.

Pilot light 50 is lit when switch 24 is open. So it remains to simply adjust the tensioning spring screw 28, via knob 32, until pilot light 50 goes out allowing the compressor clutch 42 to engage.

This setting means, of course, that any time the vacuum condition in the hose connection 20 is lesser than at idle, i.e.—stepping on the accelerator, that the check valve 52 will open and the diaphragm holding pressure in chamber area space 14 will be lessened, and switch 24 will be opened to cut-out the air conditioner. Accordingly, if this is too sensitive or low a setting, and the compressor is cutting out too often causing a warm passenger compartment, the adjustment screw 28 should be turned in more.

Usually the best time and place to make a setting adjustment is while the vehicle is climbing a small hill, since this places the engine automatically under load and calls for more power.

While the car is climbing a hill and the accelerator is depressed somewhat more to maintain speed, as is commonly done, the adjustment screw 28 should be turned out until pilot 50 is lit, which signals that the switch 24 has opened and the air conditioning has been cut-out of the system.

With this adjustment made, upon approaching the next small hill or incline, and while maintaining speed, it should be noted that pilot light 50 will come on—indicating that the air conditioning is inoperative while the engine is under its hill climbing load. And, on coming down the hill, on the other side, pilot light 50 will go off indicating that the air compressor clutch is energized.

When carrying more than the usual number of passengers, or otherwise carrying a heavier load than usual, smaller hills and inclines may cause the air conditioner to kick-out. And, if the air conditioner is needed more to maintain comfort, it remains to simply adjust the screw 28 so that a greater vacuum difference is necessary to cause the air conditioner to be cut-out of the system.

At an engine idling condition, with or without the heavy load, if the air conditioner compressor is operative and electrically in the system, so will be the fast idle solenoid 58 and the condition it sets. When the accelerator is depressed, to start the car moving, and the manifold vacuum decreases, sufficient to break the circuit with switch 24, and cut out the air conditioner compressor 42, then the fast idle setting solenoid will also be de-energized. But, this will be of no consequence since it is not needed during acceleration.

If however, during idle, the compressor clutch is disengaged through its own internal switching means, the solenoid will also be de-energized and the engine will be allowed to return to its normal "slow" idle, thus saving fuel by only using the fast idle when the compressor clutch is engaged.

From the foregoing, it can be seen that the adjustment feature, and having the switching device physically located where the driver can make adjustments, when and as required, has many advantages. Adjustments can be made for comfort and/or economy considering driver habits, terrain and climate conditions.

Such other advantages as are within the language of the hereinafter appended claims, and/or are not specifically excluded thereby, are to be considered as inclusive within the scope and spirit of this invention.

I claim:

1. Means for selectively disengaging an air conditioner compressor and removing the drag and load imposed thereby on a vehicle engine that is operative thereof, and comprising:
   a vacuum responsive switching device,
   means for electrically connecting said switching device in circuit between the magnetic clutch for an air conditioner compressor and its electrical power source,
   means for connecting said switching device to a source of intake manifold vacuum pressure for sensing the changing conditions thereof under varying engine conditions,
   and means for selectively and readily adjusting the sensitivity and response of said switching device to different load and power demands made by said engine for varying the extent and duration of the disengagement of said compressor from said engine for comfort and economy control,
   having the switching device and its adjustable means provided within the passenger compartment of the vehicle driven by said engine and serviced by said air conditioner, for each of access thereto and for adjustment and selective settings in accord with road conditions as and when encountered,
   said switching device including a diaphragm member having one side thereof responsive to engine intake manifold pressure,
   said readily adjustable means including spring means connected to said diaphragm member and for counteracting the effects of said manifold pressure,
   and threaded means for varying the strength and effects of said spring means,
   said spring means including a tension spring connected between said diaphragm and said threaded means on the opposite side of said diaphragm from that which is responsive to said manifold pressure,
   a check valve provided in said switching device for closing and shutting off vacuum pressure to said switching device,
   said check valve being biased to a closed position and being responsive to an overriding decrease in vacuum pressure by opening,
   and means provided for bleed-by around said check valve when in a closed position.

2. The means of claim 1, including;
   a fast idle setting solenoid valve provided on said engine and connected electrically into the system between said switching device and said air conditioner compressor for activation only when said air compressor clutch is operatively connected into the system.

3. The means of claim 2, including;
   a time delay relay operatively provided in the circuit with the fast idle setting solenoid for providing sufficient time delay for the engine to attain a fast idle setting before the air compressor clutch is operatively connected into the system.

* * * * *